United States Patent [19]

Jackmauh

[11] Patent Number: 5,546,665
[45] Date of Patent: Aug. 20, 1996

[54] MOTORCYCLE REAR WHEEL ALIGNMENT SYSTEM

[76] Inventor: John A. Jackmauh, 35 Winton Rd., East Windsor, Conn. 06088

[21] Appl. No.: 480,795

[22] Filed: Jun. 7, 1995

Related U.S. Application Data

[63] Continuation of Ser. No. 214,245, Mar. 17, 1994, abandoned.

[51] Int. Cl.⁶ .............................. B62M 9/16; G01B 5/255
[52] U.S. Cl. ...................... 33/203; 33/203.18; 180/231; 411/14; 474/136
[58] Field of Search ................................ 33/203, 203.18, 33/193, 600, 606, 203.12, 533, 645; 180/231; 474/101, 136; 411/8, 14

[56] References Cited

U.S. PATENT DOCUMENTS

| | | | |
|---|---|---|---|
| 4,096,636 | 6/1978 | Little | 33/203 |
| 4,411,638 | 10/1983 | Wilson | 474/136 |
| 4,540,062 | 9/1985 | Kashiwai | 180/231 |
| 4,892,449 | 1/1990 | Croxton | 411/14 |
| 5,030,173 | 7/1991 | Bryant | 474/136 |
| 5,203,424 | 4/1993 | Gogo et al. | 180/231 |

FOREIGN PATENT DOCUMENTS

| | | | |
|---|---|---|---|
| 1276557 | 12/1986 | U.S.S.R. | 180/231 |

*Primary Examiner*—Christopher W. Fulton
*Attorney, Agent, or Firm*—Fishman, Dionne & Cantor

[57] ABSTRACT

A device is disclosed for adjusting and aligning an axle of a wheeled vehicle wherein a pair of such devices are disposed on either side of a vehicle such as a motorcycle. The devices then provide a scale on both sides of the machine which are visible through sights. A person attempting to adjust and align the axle of the machine must then simply match the scales on either side of the machine to ensure that the axle is aligned.

26 Claims, 2 Drawing Sheets

MOTORCYCLE REAR WHEEL ALIGNMENT SYSTEM

CROSS-REFERENCE TO RELATED APPLICATIONS

This is a continuation of U.S. application Ser. No. 08/214,245 filed Mar. 17, 1994 now abandoned.

BACKGROUND OF THE INVENTION

1. Field of the Invention

The invention relates to a system for easily and accurately aligning the rear wheel of a motorcycle when adjusting a previously installed chain or belt drive or for repositioning the wheel when a new chain or belt is installed.

2. Prior Art

For as long as belt and chain driven wheeled apparati have been in existence, the need for adjusting tension in the belt or chain while maintaining the alignment of the driven wheel has been a concern of operators of such apparati. In the case of motorcycles the driven wheel is, in most cases, suspended by a swing arm of various dimensions for distinct machines. The swing arm generally provides an extended oval perforation along both the inside and outside edges thereof to receive an axle of the motorcycle. In order to adjust tension in the drive chain of the machine, the rear wheel sprocket and axle are moved forwardly or rearwardly depending up the type of adjustment desired.

Generally, in order to adjust the axle position, a nut, mounted on a threaded stud which is connected to the axle, must be turned to either loosen the threaded stud or tighten the same. While these apparati do effectively move the axle of the machine rearwardly or forwardly they provide no indication of the degree to which the opposite end of the axle is forward or rearward of the first end thereof. Therefore, those who endeavor to adjust the indicated drive members must guess whether or not the wheel is straight. The prior art method which is otherwise known as "dead reckoning" is a method patently lacking accuracy.

Drawbacks associated with employing the "dead reckoning" method include a dangerous riding condition occasioned by misalignment, excessive wear on the drive chain or belt, sprockets and tire, reduced fuel economy, and the risk of "throwing" the drive member, causing the rider delay at best and at worst possibly injury. Clearly these drawbacks are undesirable.

A further drawback of the "dead reckoning" method is that it is time consuming. One must adjust one side of the axle to a "guesstimated" position and then adjust the other side. One of skill in the art will readily recognize that the second adjustment affects the tension in the first end of the axle as well. Further adjustments, all of which are more guesses, are required, before even a dead reckoning observation can be made.

All of the above drawbacks are easily alleviated by the present invention as described hereunder.

SUMMARY OF THE INVENTION

The above-discussed and other drawbacks and deficiencies of the prior art are overcome or alleviated by the adjustment and alignment system of the invention.

The present invention provides a two piece apparatus for quickly, easily and accurately adjusting and aligning a rear wheel of a motorcycle. The invention provides a heavy duty axle positioning member having a graduated scale thereon. The axle positioning member is adapted to extend through a block positioned at the end of a swingarm. The block includes a window, sight and indicator through which a portion of the graduated scale is visible. By adjusting both of the apparati to read the same number on the scale, the adjuster can be confident that the axle is aligned properly. Therefore, the mechanic need only adjust chain or belt tension and then finely adjust the positioning members to the same reading to complete the job. Employing the device pair of the invention, accuracy is ensured and elapsed time is minimized.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Figure 1:
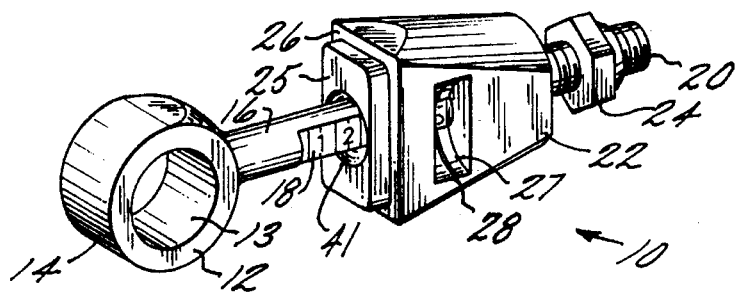
FIG. 1 illustrates a perspective view of one side of the device pair of the invention.
Figure 3:
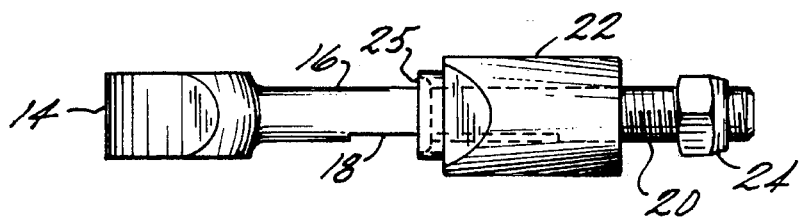
FIG. 3 is a plan view of FIG. 1.
Figure 6:
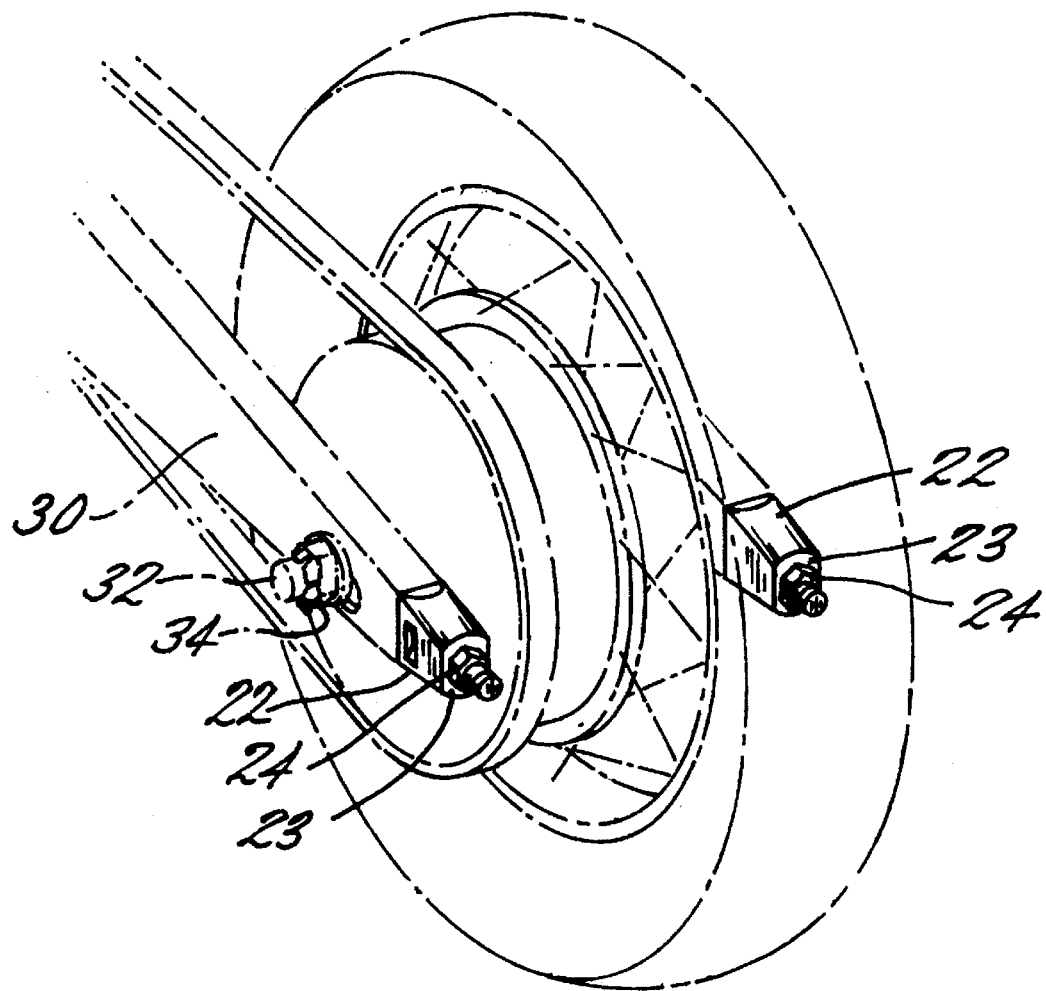
FIG. 6 is a perspective view of the device pair of the invention illustrated in use, with motorcycle components illustrated in phantom.

Referring now to FIG. 1, one side of the device pair of the invention is illustrated generally at 10. The device as set forth above is particularly suited for positioning, in an aligned manner, the rear axle of a motorcycle or other apparatus which requires aligned positioning of an axle to adjust the drive means thereof. It will be appreciated that many different apparati can be adjusted and aligned using the device of the invention either without or with minor modification. Such uses are within the scope of this invention. Similarly it will be appreciated that although in the preferred embodiment of the present invention the pair of devices is required (as illustrated in use in FIG. 6), a single side of the device pair of the invention may be employed for particular apparati which require frequent disassembly so that adjustment thereof can simply be accomplished by tightening nut 24 until the scale 18 is at the predetermined position.

With reference particularly to all of the drawing figures the preferred embodiment of the invention is illustrated.

It should be noted that in the most preferred embodiment of the invention the ring 12 is preferably integral with threaded stud 16 for strength, however, it is acceptable for the ring 12 to be welded to stud 16, if desired.

Ring 12 preferably provides an inner surface 13 having a diameter of approximately ¾ of an inch, however, may be sized accordingly to closely fit the outer diameter of the axle upon which it will ride. Inner surface 13 should be smooth bored for enhanced operation of the device. Outer surface 14 of ring 12 must be dimensioned to fit within a swingarm 30 (illustrated in phantom in FIG. 6) yet maintain sufficient thickness between inner surface 13 and outer surface 14 to provide enough strength to move axle 32 forwardly and rearwardly as desired. It will be appreciated by one of skill in the art that it is not necessary that ring 12 actually maintain the position of the axle independently, rather it must only provide positioning strength. Axle nut 34 maintains the axle after positioning, nut 34 not being a part of the invention.

Figure 2:
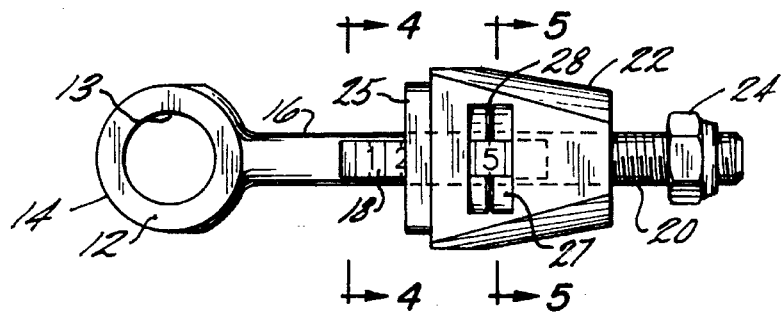
FIG. 2 is an elevational side view of FIG. 1.

Stud 16, attached to ring 12 either by being initially integrally formed therewith or subsequently attached thereto, extends for at least several inches to provides a scale 18 and a threaded portion 20. Scale 18 preferably provides a graduated system as illustrated in FIGS. 1 and 2. Scale 18 is most preferably flat ground and engraved with several numerals and full and half lines of sufficient size to be easily read by the unaided eye. It will be appreciated, however, that the scale may be created without flat grinding stud 16, if desired, by such as engraving the curved surface of the stud 16. It should also be noted that scale 18 is preferably inverted from one side of the motorcycle swing arm 30 to the other such that the numerals are right-side-up on both sides of swing arm 30. Finally, stud 16 includes threaded portion 20 which most preferably is of a ½—20 thread.

Figure 4:
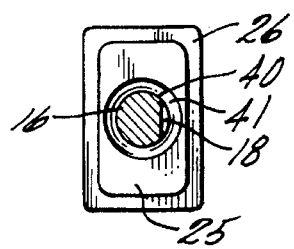
FIG. 4 is a cross section view of the invention taken along section line 4—4.
Figure 5:
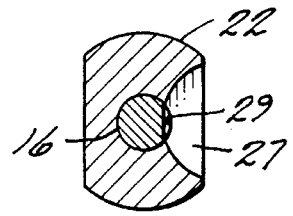
FIG. 5 is a cross section view of the invention taken along section 5—5.

As illustrated in each of the figures, block 22 is provided to abut swingarm 30 to provide, inter alia, a bearing surface 23 on which nut 24 will bear. Block 22 abuts swingarm 30 with orienting and aligning plateau 25 and abutting shoulder 26. Plateau 25 and shoulder 26 ensure that block 22 is properly positioned and aligned for both aesthetic and functional purposes. It will be recognized that the entire block 22 assembly with plateau 25 could be round or oval as opposed to square or rectangular (preferred) if a rounded or oval swing arm 30 were employed on the motorcycle to be fitted. Other shapes are also acceptable with the mere proviso that the inner shape of the swingarm be matched by the plateau of block 22. Block 22, in the preferred embodiment provides window 27, most preferably with indicator line 28. Window 27 is most preferably an arcuately ground section as shown which provides both an extended indicator line 28 and a sight 29 which. intersects central bore 40 providing a direct view of scale 18 when stud 16 is inserted in central bore 40. It will be appreciated, however, that many different window types may be employed without departing from the spirit and scope of the invention. For ease of insertion of stud 16 in central bore 40 an angled countersink 41 is provided, as illustrated in FIGS. 1 and 4, in the plateau 25, to act as a funnel for stud 16.

Block 22 may be machined externally as desired for aesthetic purposes.

In the most preferred embodiment nut 24 includes a polymeric ring which functions to lock the nut in place regardless of vibration. It will be appreciated, of course, however that two nuts 24 tightened together will provide an identical function. This type of locking of two nuts together is well known in the art and therefore does not require illustration. It will be understood that any type of material may be used for either of the stud or block providing that the material is of sufficient strength to withstand compression of an axle nut and of sufficient tensile strength to allow a user to position the axle of the apparatus. While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A device for positioning and aligning an axle comprising a pair of devices, each device including:

a) a ring fixedly attached to a stud, said stud being threaded at an end portion opposed from said ring, said stud further having a scale thereon;

b) a block having a central bore to accept through passage of said stud and a provision for viewing said scale on said stud, said block including a first bearing surface for bearing against an end of a swingarm and a second bearing surface for providing a surface against which a nut threaded on said threaded end portion of said stud will bear to draw said stud and position said axle.

2. A device as claimed in claim 1 wherein said ring and stud are initially integrally formed.

3. A device as claimed in claim 2 wherein the ring and stud are initially integrally formed by machining.

4. A device as claimed in claim 2 wherein the ring and stud are initially integrally formed by forging.

5. A device as claimed in claim 2 wherein the ring and stud are initially integrally formed by casting.

6. A device as claimed in claim 1 wherein said scale on each of said pair of studs is a mirror image one to the other.

7. A device as claimed in claim 1 wherein said threaded end is a ½—20 unf thread.

8. A device as claimed in claim 3 wherein said ring and stud comprise a machineable material.

9. A device as claimed in claim 1 wherein said scale is engraved in said stud.

10. A device as claimed in claim 1 wherein said scale is printed on said stud.

11. A device as claimed in claim 9 wherein said stud includes a flat ground portion and said scale is engraved on said flat ground portion of said stud.

12. A device as claimed in claim 10 wherein said stud includes a flat ground portion and said scale is printed on said flat ground portion of said stud.

13. A device as claimed in claim 1 wherein said central bore includes an angled countersink.

14. A device as claimed in claim 1 wherein said provision includes an indication line.

15. A device as claimed in claim 14 wherein said indicator line is printed on said provision.

16. A device as claimed in claim 14 wherein said indicator line is engraved in said provision.

17. A device as claimed in claim 14 wherein said indicator line is a raised portion of the block material within the area of the provision.

18. A device as claimed in claim 1 wherein said provision includes a sight for viewing said scale.

19. A device as claimed in claim 18 wherein said provision is a substantially arcuate depression in said block and intersects said central bore at said sight.

20. A device as claimed in claim 18 wherein said provision is an angled depression in said block and intersects said central bore at said sight.

21. A device as claimed in claim 1 wherein said first bearing surface includes a plateau for engaging an inner dimension of said swingarm.

22. A device as claimed in claim 21 wherein said plateau is in the shape of a parallelogram.

23. A device as claimed in claim 21 wherein said plateau is an arcuate shape.

24. A device as claimed in claim 21 wherein said block comprises 1018 steel.

25. A method for positioning and aligning an axle comprising the steps of a) removing the axle and installing the device of claim 1 by aligning the ring of each of the pair of devices on each side of the axle and extending the axle therethrough within each side of a swing arm of a wheeled machine and placing the block of each of said pair of devices, one over each of said studs while each said block contacts said swing arm and placing the nut on each said stud:

b) tightening the nut threaded on the stud against the second bearing surface of each block to urge both ends of the axle to a selected position on the scale to ensure alignment of the axle;

c) tightening at least one axle retaining nut against the swing arm to secure said axle.

26. A device as claimed in claim 8 wherein the machineable material is steel.

* * * * *